United States Patent

Shamshoum et al.

[11] Patent Number: 5,847,059
[45] Date of Patent: Dec. 8, 1998

[54] CATALYST YIELD FROM SUPPORTED METALLOCENE CATALYSTS

[75] Inventors: Edwar Shoukri Shamshoum, Houston; Christopher Garland Bauch, Seabrook, both of Tex.

[73] Assignee: Fina Technology, Inc., Dallas, Tex.

[21] Appl. No.: 770,886

[22] Filed: Dec. 20, 1996

[51] Int. Cl.$^6$ ........................................................ C08F 4/64
[52] U.S. Cl. .......................... 526/116; 526/114; 526/119; 526/160; 526/943; 526/153; 526/351; 502/113; 502/152
[58] Field of Search .................................... 526/114, 116, 526/119, 160, 343

[56] References Cited

U.S. PATENT DOCUMENTS

| | | | |
|---|---|---|---|
| 5,350,817 | 9/1994 | Winter et al. | 526/119 |
| 5,374,700 | 12/1994 | Tsutsui et al. | 526/348.3 |
| 5,616,665 | 4/1997 | Jejelowo et al. | 526/129 |

OTHER PUBLICATIONS

Macromolecules, 1990, 23, pp. 4489–4491.

*Primary Examiner*—David W. Wu
*Attorney, Agent, or Firm*—Jim D. Wheelington; M. Norwood Cheairs

[57] ABSTRACT

The present invention provides a catalyst and a process for increased catalyst activity and polymer yield. The catalyst system used in the process includes at least two supported metallocene catalyst precursor in combination with an oxy-organoaluminum. The process can be applied to the polymerization of olefins, preferably olefin of three carbon atoms and higher, particularly propylene. The catalyst activity and polymer yield for a dual supported metallocene catalyst are increased over that for a single supported metallocene catalyst. The polymer produced by this dual supported metallocene system has a relatively broad molecular weight distribution.

16 Claims, No Drawings

CATALYST YIELD FROM SUPPORTED METALLOCENE CATALYSTS

BACKGROUND

1. Technical Field

The present invention provides a catalyst and a process for the polymerization of olefins, particularly propylene, that increases catalyst activity and polymer yield. The catalyst precursors are metallocene compounds of the formula:

$$R''_b(CpR_{5-b})(CpR'_{5-b})MR^*_{v-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M. At least two metallocene compounds are supported on silica treated with alumoxane. The supported metallocene catalysts are activated with an aluminum alkyl.

2. Description of Prior Art

U.S. Pat. No. 4,530,914 discloses a catalyst system having at least two different metallocenes each having different propagation and termination rate constants of polymerization, primarily for the polymerization/copolymerization of ethylene. The polymer would have a broad or multimodal molecular weight distribution. Generally, metallocenes having two different metals were used in combination.

U.S. Pat. No. 5,525,678 discloses a bimetallic catalyst to produce a broad or bimodal molecular weight distribution polyolefin resin. The bimetallic catalyst is metallocene in combination with a non-metallocene on a silica carrier impregnated with an alumoxane. A cocatalyst of an aluminum alkyl activates the catalyst. The catalyst produces a broad or bimodal molecular weight distribution polyethylene.

U.S. Pat. No. 4,939,217 discloses a process for producing a polyolefin having a multimodal molecular weight distribution in which at least two different metallocenes each having different olefin polymerization termination rate constants in the presence of hydrogen are used.

U.S. Pat. No. 4,937,299 discloses polymerization of olefins with a catalyst system of at least two different metallocenes to obtain a reactor blend of polyethylene and ethylene-alpha-olefin copolymer. The catalysts may be supported for slurry or gas phase polymerization.

U.S. Pat. No. 4,701,432 discloses a catalyst of at least one metallocene and at least one non-metallocene transition metal compound on a single support with a cocatalyst system of an alumoxane and an organometallic compound. The support is a porous solid, such as silica, which may be treated with an organometallic compound, such as trimethyl aluminum.

SUMMARY OF THE INVENTION

The present invention provides a process and catalyst for the polymerization of olefins, preferably of three carbon atoms and higher, such as propylene, butene, pentene, hexene, heptene, octene, nonene, decene, etc., wherein the process includes using a particular catalyst system which results in a significant increase in the activity of the catalyst and polymer yield. The catalyst system is at least metallocene catalysts with precursors of the catalyst being neutral metallocene compounds of the formula:

$$R''_b(CpR_{5-b})(CpR'_{5-b})MR^*_{v-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M. The metallocene compounds are activated as a catalyst by an ionic ionizing agent or co-catalyst, such as an oxyorganoaluminum compound.

This invention provides a process for the polymerization of olefins. The process comprises: supporting at least two metallocene compounds on an inert carrier treated with an oxyorganoaluminum compound, preferably an alumoxane; contacting the metallocene-alumoxane with an alkyl aluminum to form an active catalyst; and introducing the catalyst into a polymerization reaction zone containing the monomers.

DETAILED DESCRIPTION OF THE INVENTION

The present invention relates to the use of a particular catalyst for polymerization of olefins, particularly propylene. This catalyst system produces significantly higher catalyst activity than provided by a single supported metallocene catalyst.

It has been discovered that a particular catalyst significantly enhances the catalyst activity and polymer yield of propylene polymerization. The catalyst comprises a metallocene catalyst precursor which generally contains two cyclopentadienyl rings, substituted or unsubstituted, which are coordinated to a transition metal. The cyclopentadienyl rings may be bridged or unbridged. The bridge if present increase the stereorigidity of the metallocene compound and resulting catalyst. Increased stereorigidity is generally preferred for polymerization of olefins of three carbon atoms or greater.

Metallocene catalysts can be generally defined as a metal derivative of cyclopentadiene, which has been ionized to form an active cationic metallocene catalyst. The metallocene compound is of the general formula:

$$R''_b(CpR_{5-b})(CpR'_{5-b})MR^*_{v-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R" are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M.

For a syndiospecific catalyst, each $(CpR_{5-b})$ and $(CpR'_{5-b})$ are different and bilateral symmetry exists for $(CpR_{5-b})$, at least for the distal substituents, which is preferably an unsubstituted cyclopentadienyl and $(CpR'_{5-b})$ is preferably fluorenyl, substituted or unsubstituted, and preferably bilateral symmetrical. One particular metallocene catalyst precursor which can be used in the present invention for the polymerization of olefins is disclosed in U.S. Pat. Nos. 4,892,851; the disclosure of which is hereby incorporated. Illustrative examples of the metallocene compound are isopropylidene(cyclopentadienyl-1-2,7-di-t-butylfluorenyl) zirconium dichloride and diphenylmethylidene (cyclopentadienyl-1-fluorenyl)zirconium dichloride.

For an isospecific catalyst, each ($CpR_{5-b}$) and ($CpR'_{5-b}$) are preferably the same and, more preferably, are a cyclopentadienyl or indenyl ring, substituted or unsubstituted. Examples of these isospecific catalysts are dimethylsilylbis (2-methylindenyl) zirconium dichloride and dimethylsilylbis(2-methyl-4-phenyl indenyl)zirconium dichloride. In the alternative, for an isospecific catalyst ($CpR'_{5-b}$) is a sterically different substituted cyclopentadienyl ring than ($CpR'_{5-b}$) in which one cyclopentadienyl ring is an unsubstituted fluorenyl and one and only one of the distal positions of the other cyclopentadienyl rings has a bulky group as a substituent having a spatial displacement greater than a methyl ($CH_3$) group and, more preferably, having a spatial displacement equal to or greater than a t-butyl group ($CH_3CH_3CH_3C$) group as disclosed in U.S. Pat. No. 5,416,228, issued May 16, 1995, hereby incorporated by reference. An example of this isospecific catalyst is isopropylidene(t-butycyclopentadienyl-1-fluorenyl) zirconium dichloride.

The preferred dual supported metallocene catalyst system has two metallocene catalyst precursors. It is also preferred that both metallocene precursors are syndiospecific or both are isospecific. If both are syndiospecific, it is preferred that ($CpR_{5-b}$) is an unsubstituted cyclopentadienyl ring for both metallocene precursors but ($CpR'_{5-b}$) of one metallocene precursor may be a substituted fluorenyl ring while ($CpR'_{5-b}$) of the other metallocene precursor may be an unsubstituted fluorenyl ring. Further, for a dual supported syndiospecific metallocene catalyst system it is preferred M is the same for both metallocene precursors.

Bilateral symmetry is defined as the condition in which there are no substituents or one or more substituents on one side and no substituents or one or more of the same substituents on the other side in the same relative position such that a mirror image is formed from one side to another. One example of such a compound is isopropyl (cyclopentadienyl-1-fluorenyl)zirconium dichloride, abbreviated iPr(Cp)(Flu)ZrCl$_2$. An illustration of the ligands of this compound are shown below:

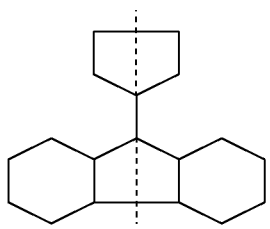

Bilateral symmetry is illustrated by a plane bisecting the zirconium metal and the bridge resulting in the right side of each ligand being a mirror image of its left side.

Pseudobilateral symmetry is defined as symmetry such that a mirror image exists from one side to the other in regard to the existence and position of substituents but the substituents themselves are not identical. This is illustrated below:

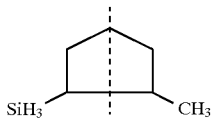

Pseudobilateral symmetry is illustrated by a plane bisecting the ligand with the substituents being in the same relative position on each side of the plane, i.e., forming a mirror image as to location of substituents on the substituted cyclopentadienyl ring, but the substituents are not the same.

It is believed that bilateral symmetry must exist for the β (distal) substituents of the cyclopentadienyl ring but is of less importance and may not be necessary for the α (proximal) substituents of the cyclopentadienyl ring. It is further believed that bilateral symmetry of substituents of the fluorenyl ring is of less importance and may not be necessary. It is believed that bilateral symmetry of less importance and may not be necessary for the bridge.

One embodiment of the present invention includes forming a supported metallocene catalyst on an inert, non-reactive support, such as silica which has been treated with an alumoxane. The supported metallocene catalyst can be suspended in an inert liquid carrier, such as mineral oil, contacted with a trialkylaluminum co-catalyst, such as triisobutyl aluminum, and introduced into a polymerization reaction zone which contains a monomer.

The support should be an inert solid which is chemically unreactive with any of the components of the metallocene catalyst. The support is preferably silica. Examples of silica which are to be used to provide a support source for the catalyst are. One example of silica operative in this invention is chromatography grade silica. The silica may be treated with methylalumoxane (MAO) in the following manner: The silica had water removed to a level of approximately 0.5%–1.0%. The dried silica was slurried in a non-polar solvent. A solution of alumoxane in solvent was added to the silica slurry. After heating and subsequently cooling the slurry, the solid (silica treated with alumoxane) was separated out and (optionally) dried.

The metallocene may be contacted with the MAO-treated silica to form a supported metallocene catalyst in the following manner: A solution of metallocene in a hydrocarbon solvent was added to a slurry of silica treated with alumoxane also in a hydrocarbon solvent, preferably the same solvent as the metallocene solution and maintained at a set temperature. The solid, metallocene supported on silica treated with alumoxane, was separated out and dried.

A suspension may be formed with the supported metallocene catalyst in an inert liquid carrier, such as mineral oil. The liquid carrier is selected based on the following properties:

1. The liquid does not dissolve the solid catalyst component.
2. The liquid has minimal chemical interaction with the catalyst component.
3. The liquid is preferably an inert hydrocarbon.
4. The liquid only "wets" the catalyst component
5. The liquid has sufficient viscosity to maintain the catalyst component in suspension without excessive agitation. Liquids which would be effective in this invention would be long chain hydrocarbons, such as mineral oil, wax, etc. This listing is not intended to be complete and all inclusive but is merely made to show examples of useful liquid media.

A co-catalyst is utilized to aid in the activation of the catalyst for the polymerization reaction. The most commonly used co-catalyst is an organoaluminum compound which is usually an alkyl aluminum. The aluminum alkyl is of the general formula AlR'$_3$ where R' is an alkyl of from 1–8 carbon atoms or a halogen and R' may be the same or different with at least one R$^1$ being an alkyl. Examples of aluminum alkyls are trimethyl aluminum (TMA), triethyl aluminum (TEAl), triisobutyl aluminum (TiBAl) and diethyl aluminum chloride (DEAC). The preferred co-catalysts an aluminum trialkyl, specifically TEAl or triisobutyl aluminum ("TIBAl").

The present invention provides a process for the polymerization of propylene the catalyst precursor described by the above formula comprising:

a) selecting at least two metallocene catalyst precursors for the polymerization of propylene;

b) supporting the metallocene compound on an inert carrier which has been treated with an alumoxane;

c) contacting the supported metallocene-alumoxane with an alkylaluminum compound to activate the catalyst;

d) introducing the catalyst into a polymerization reaction zone containing propylene and e) extracting polymer product from the reactor.

The invention having been generally described, the following examples are given as particular embodiments of the invention and to demonstrate the practice and advantages thereof. It is understood that the examples are given by way of illustration and are not intended to limit the specification or the claims to follow in any manner. The following Examples and Comparative Examples illustrate the present invention and its various advantages in more detail. The results are summarized in Tables 1 and 2.

Silica (SiO$_2$), which has been dried to approximately 0.5%–1.0% water content, is slurried in toluene and treated with methylaluminoxane (MAO) in a ratio of 0.5–3.0 g (preferably 0.6–0.9) of MAO per gram of SiO$_2$. The slurry is then heated to 115° C. for 4 hours. The solid is then washed three times with toluene. A solution of metallocenes is added to the toluene slurry of MAO/SiO$_2$ to give a 1.0–3.0 wt % loading (preferably 2.0%). The slurry is then stirred for one hour at room temperature. The toluene is decanted off and the resulting solid is washed three times with hexane and dried in vacuo.

EXAMPLE 1

The metallocenes used were diphenylmethylidene (cyclopentadienyl-fluorenyl) zirconium and isopropylidene (cyclopentadienyl-1-2,7,di-t-butylfluorenyl)zirconium dichloride at 1.3 weight percent and 0.7 weight percent, respectively.

The catalyst was prepared per the procedure above. A slurry of 36 mg solid catalyst component and 108 mg of triisobutylaluminum (TIBAl) was prepared and added to a 2.0 liter autoclave from which the air had been sufficiently replaced by nitrogen. The autoclave was then charged with 1.4 liters of liquid propylene and 16 mmoles of gaseous hydrogen. The mixture was then heated to 60° C. and maintained for 60 minutes. The polymer was then dried. Polymerization results are shown in Table I.

| Wt. of Catalyst Component: | 36 mg |
| Amount of TiBAl (Activator): | 108 mg |
| Temp. | 60° C. |
| Time: | 60 mins. |
| Propylene | 1.4 liter |
| Hydrogen | 16 mmol |

EXAMPLE 2

The procedures of Example 1 were repeated with the exception that the metallocenes were used at 1.5 weight percent and 0.5 weight percent, respectively. The results are shown in Table 1.

EXAMPLE 3

The procedures of Example 1 were repeated with the exception that the metallocenes were used at 1.6 weight percent and 0.4 weight percent, respectively. The results are shown in Table 1.

TABLE I

Polymerization Data for Co-Supported sPP Metallocenes

| EX. # | Metcn A | Metcn B | Yield (g) | BD (g/cc) | MF (g/10 min) | XS | Mn | Mw | D |
|---|---|---|---|---|---|---|---|---|---|
| 1 | 1.3% | 0.7% | 315 | 0.36 | 11.50 | 3.43 | 26474 | 114108 | 4.3 |
| 2 | 1.5% | 0.5% | 320 | 0.38 | 4.60 | 2.50 | 31558 | 142745 | 4.5 |
| 3 | 1.6% | 0.4% | 340 | 0.37 | 3.00 | 2.08 | 34104 | 158964 | 4.7 |

Comparative Example 1

The procedures of Example 1 were repeated with the exception that only diphenylmethylidene(cyclopentadienyl-1-fluorenyl) zirconium dichloride was supported on the MAO-treated silica and used in the polymerization. The results are shown in Table 2.

Comparative Example 2

The procedures of Comparative Example 1 were repeated with the exception that only isopropylidene (cyclopentadienyl-1-2,7-di-t-butylfluorenyl)zirconium dichloride was supported on the MAO-treated silica and used in the polymerization. The results are shown in Table 2.

TABLE II

Polymerization Data for Supported sPP Metallocenes

| Comparative Ex. # | Metcn A | Metcn B | Yield (g) | BD (g/cc) | MF (g/10 min) | XS | Mn | Mw | D |
|---|---|---|---|---|---|---|---|---|---|
| 1 | 2.0% | — | 258 | 0.33 | 0.80 | 0.74 | 102448 | 246593 | 2.4 |
| 2 | | 2.0% | 285 | 0.36 | >75 | 5.16 | 18629 | 38715 | 2.1 |

The most significant unexpected result obtained from the supported metallocene catalysts is the dramatic increase in the catalyst activity.

| | |
|---|---|
| Example 1 - 8750 g/g · hr | Comparative Example 1 - 7167 g/g · hr |
| Example 2 - 8889 g/g · hr | Comparative Example 2 - 7917 g/g · hr |
| Example 3 - 9472 g/g · hr | Average - 7542 g/g · hr |
| Average - 9037 g/g · hr | |

There is an almost 20% increase in catalyst activity by using a dual supported metallocene catalyst system instead of a single supported metallocene catalyst.

In addition, the dual supported metallocene catalyst system produces a polymer which has a broader molecular weight distribution than that produced by a single supported metallocene catalyst. The molecular weight distribution (D) of Examples 1–3 are almost double that for Comparative Examples 1 and 2.

The dual supported metallocene catalyst system demonstrated an increase in catalyst yield over either of the components used as a single supported metallocene catalyst. The process of the present invention will also be effective to produce a broader molecular weight distribution polymer product.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for the polymerization of propylene consisting of:

(a) selecting two syndiospecific metallocene catalyst precursors of the formula:

$$R''_b(CpR_{5-b})(CpR'_{5-b})MR^*_{v-2}$$

where R" is a bridge imparting stereorigidity to the structure to the metallocene by connecting the two cyclopentadienyl rings, b is 1, Cp is a cyclopentadienyl ring, R and R' are substituents on the cyclopentadienyl rings and are a hydride or a hydrocarbyl from 1–9 carbon atoms, each R and R' being the same or different, each $(CpR_{5-b})$ and $(CpR'_{5-b})$ are different and bilateral symmetry exists for $(CpR_{5-b})$ for the distal substituents, M is a Group IIIB, IVB, VB or VIB metal, R* is a hydride, a halogen or a hydrocarbyl from 1–20 carbon atoms, v is the valence of M, wherein each metallocene catalyst precursor is different; (b) supporting the metallocene catalyst precursors on a silica treated with an oxyorganoaluminum compound; (c) contacting the supported metallocene catalyst with an aluminum alkyl to activate the catalyst; (d) introducing said catalyst into a polymerization reaction zone containing propylene; (e) withdrawing a polypropylene product.

2. The process of claim 1 wherein $(CpR_{5-b})$ is an unsubstituted cyclopentadienyl ring for both metallocene precursors.

3. The process of claim 1 wherein M is the same for both metallocene precursors.

4. The process of claim 1 wherein $(CpR'_{5-b})$ of one metallocene precursor is a substituted fluorenyl ring and $(CpR'_{5-b})$ of the other metallocene precursor is an unsubstituted fluorenyl ring.

5. The process of claim 1 wherein one metallocene catalyst precursor is isopropylidene(cyclopentadienyl-1-2,7,di-t-butylfluorenyl)zirconium dichloride.

6. The process of claim 1 wherein one metallocene catalyst precursor is diphenylmethylidene (cyclopentadienyl-fluorenyl) zirconium dichloride.

7. The process of claim 1 wherein said oxyorganoaluminum compound is an alumoxane.

8. The process of claim 1 wherein said oxyorganoaluminum compound is methylalumoxane.

9. The process of claim 1 wherein the metallocene catalyst precursors are present from 1.0 to 3.0 weight percent.

10. The process of claim 1 wherein the metallocene catalyst precursors are present at 2.0 weight percent.

11. The process of claim 6 wherein diphenylmethylidene (cyclopentadienyl-fluorenyl) zirconium dichloride is present from 1.3 to 1.6 weight percent.

12. The process of claim 5 wherein isopropylidene (cyclopentadienyl-1-2,7,di-t-butylfluorenyl)zirconium dichloride is present from 0.4 to 0.7 weight percent.

13. The process of claim 1 wherein the two metallocene catalyst precursors are diphenylmethylidene (cyclopentadienyl-fluorenyl)zirconium dichloride and isopropylidene (cyclopentadienyl-1- 2,7,di-t-butylfluorenyl) zirconium dichloride.

14. The process of claim 13 wherein the weight ratios between the two metallocene catalyst precursors ranges from 2:1 to 5:1.

15. The process of claim 8 wherein the ratio of $MAO/SiO_2$ ranges from 1.5 to 3.0 g of MAO per gram of $SiO_2$.

16. The process of claim 15 wherein the ratio of $MAO/SiO_2$ is 2.5 g of MAO per gram of $SiO_2$.

* * * * *